United States Patent
Van Wageningen

(10) Patent No.: US 11,968,133 B2
(45) Date of Patent: Apr. 23, 2024

(54) INTERFERENCE HANDLING FOR WIRELESS NETWORKS WITH MULTIPLE COORDINATORS

(71) Applicant: SIGNIFY HOLDING B.V., Eindhoven (NL)

(72) Inventor: Andries Van Wageningen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 627 days.

(21) Appl. No.: 16/981,881

(22) PCT Filed: Mar. 5, 2019

(86) PCT No.: PCT/EP2019/055398
§ 371 (c)(1),
(2) Date: Sep. 17, 2020

(87) PCT Pub. No.: WO2019/179761
PCT Pub. Date: Sep. 26, 2019

(65) Prior Publication Data
US 2021/0119743 A1  Apr. 22, 2021

(30) Foreign Application Priority Data

Mar. 19, 2018 (EP) ..................... 18162470
May 8, 2018 (EP) ..................... 18171128

(51) Int. Cl.
*H04L 5/00* (2006.01)
*H04B 10/112* (2013.01)
(Continued)

(52) U.S. Cl.
CPC ........ *H04L 5/0032* (2013.01); *H04B 10/1129* (2013.01); *H04W 72/541* (2023.01); *H04W 72/542* (2023.01)

(58) Field of Classification Search
CPC ............. H04L 5/0032; H04W 72/542; H04W 72/541; H04B 10/1129
See application file for complete search history.

(56) References Cited

U.S. PATENT DOCUMENTS

| | | | |
|---|---|---|---|
| 8,432,887 | B1 | 4/2013 | Ding |
| 2009/0232105 | A1 | 9/2009 | Kesselman et al. |

(Continued)

FOREIGN PATENT DOCUMENTS

| | | |
|---|---|---|
| CN | 101360321 A | 2/2009 |
| CN | 102204142 A | 9/2011 |

(Continued)

OTHER PUBLICATIONS

Li Qiang, et al., General considerations and proposals for low rate PD communications, IEEE 802.15/16/0029-00-007a, IEEE Standards Association, Jan. 10, 2016, Internet, < URL: https://mentor.ieee.org/802.15/dcn/16/15/16/0029-00-007a-general-considerations-and-proposals-for-low-rate-pd-communications.pptx>.

(Continued)

*Primary Examiner* — Mina M Shalaby

(57) ABSTRACT

In a LiFi network with multiple coordinators, interference in the overlapping areas between the local parts of the network can occur if each coordinator determines its own local time schedule for communicating with devices. To solve this problem, the invention proposes cooperation between the coordinators to determine non-interfering local time schedules whereby the coordinators rely on interference reports from the devices in the overlapping areas and apply a small number of simple rules. The proposed method is simple, scalable and independent from a central unit.

22 Claims, 15 Drawing Sheets

(51) Int. Cl.
*H04W 72/541* (2023.01)
*H04W 72/542* (2023.01)

(56) References Cited

U.S. PATENT DOCUMENTS

| | | |
|---|---|---|
| 2010/0317339 A1 | 12/2010 | Koc |
| 2013/0208708 A1 | 8/2013 | Nezou et al. |
| 2013/0330085 A1 | 12/2013 | Kusakari |
| 2014/0016478 A1 | 1/2014 | Koskela et al. |
| 2014/0050128 A1 | 2/2014 | Campoy Cervera et al. |
| 2014/0112175 A1 | 4/2014 | Pantelidou et al. |
| 2015/0078259 A1 | 3/2015 | Junior et al. |
| 2015/0318922 A1 | 11/2015 | Poola et al. |
| 2016/0157195 A1 | 6/2016 | Wang et al. |
| 2017/0127409 A1 | 5/2017 | Mishra et al. |
| 2019/0028193 A1* | 1/2019 | Miras ............... H04B 10/1149 |
| 2021/0119743 A1* | 4/2021 | Van Wageningen ................. H04W 72/542 |
| 2021/0328675 A1* | 10/2021 | Hofer ............... H04B 10/1143 |
| 2022/0006527 A1* | 1/2022 | Van Wageningen ................. H04B 10/116 |
| 2022/0014271 A1* | 1/2022 | Van Wageningen ................. H04B 10/1149 |
| 2022/0321217 A1* | 10/2022 | Van Wageningen ................. H04B 10/1149 |
| 2023/0090182 A1* | 3/2023 | Salas Moreno ... H04W 36/0085 370/331 |
| 2023/0111629 A1* | 4/2023 | Van Wageningen ................. H04B 10/1129 398/118 |
| 2023/0179299 A1* | 6/2023 | Van Wageningen ................. H04B 10/2939 398/106 |
| 2023/0179300 A1* | 6/2023 | Germe ............ H04B 10/116 398/130 |

FOREIGN PATENT DOCUMENTS

| | | |
|---|---|---|
| JP | 2003219481 A | 7/2003 |
| KR | 20140110907 A | 9/2014 |
| WO | 2011113217 A1 | 10/2012 |
| WO | 2017156748 A1 | 9/2017 |
| WO | 2017/185380 A1 | 11/2017 |
| WO | 2017185380 A1 | 11/2017 |

OTHER PUBLICATIONS

Guo Peng et al., 3D Wireless Sensor Network Interface Problem, Computer Engineering and Science, 2009, 23 pgs.
Guo et al., "Research on the Interference Problem of 3D Wireless Sensor Networks", Computer Engineering & Science, Dept. of Electronics and Information Engineering, Huazhong University of Science and Technology, Wuhan 430074, China, (2009), vol. 31, No. 3, ISSN 1007-130X.

\* cited by examiner

|    | D1 | D2 | D3 | D4 | D5 | D6 | D7 | D8 |
|----|----|----|----|----|----|----|----|----|
| C1 | O  | O  |    |    | O  | O  |    |    |
| C2 |    |    |    |    | O  |    |    |    |
| C3 | O  | O  | O  | O  |    |    |    |    |
| C4 | O  |    | O  |    |    |    | O  | O  |

|    | D1 | D2 | D3 | D4 | D5 | D6 | D7 | D8 |
|----|----|----|----|----|----|----|----|----|
| C1 | O  | X  |    |    | X  | X  |    |    |
| C2 |    |    |    |    | O  |    |    |    |
| C3 | X  | O  | X  | X  |    |    |    |    |
| C4 | O  |    | O  |    |    |    | X  | X  |

Fig. 8B

|    | D1 | D2 | D3 | D4 | D5 | D6 | D7 | D8 |
|----|----|----|----|----|----|----|----|----|
| C1 | O  | !  |    |    | !  | X  |    |    |
| C2 |    |    |    |    | O  |    |    |    |
| C3 | !  | O  | !  | X  |    |    |    |    |
| C4 | O  |    | O  |    |    |    | X  | X  |

Fig. 8C

|    | TC 1         | TC 2   | TC 3         | TC 4   |
|----|--------------|--------|--------------|--------|
|    | Res 1        | Res 2  | Res 3        | Res 4  |
| C1 | D2*, D5*, D6 | D6     | D1**         | D6     |
| C2 | D5**         |        |              |        |
| C3 | D2**         | D4     | D1*, D3*, D4 | D4     |
| C4 | D7, D8       | D7, D8 | D1**, D3**   | D7, D8 |

Fig. 8D

|    | D1 | D2 | D3 | D4 | D5 | D6 | D7 | D8 |
|----|----|----|----|----|----|----|----|----|
| C1 |    | O  |    |    | O  | O  |    |    |
| C2 |    |    |    |    | O  |    |    |    |
| C3 | O  | O  | O  | O  |    |    |    |    |
| C4 | O  |    | O  |    |    |    | O  | O  |

|    | D1 | D2 | D3 | D4 | D5 | D6 | D7 | D8 |
|----|----|----|----|----|----|----|----|----|
| C1 |    | X  |    |    | X  | X  |    |    |
| C2 |    |    |    |    | O  |    |    |    |
| C3 | X  | O  | X  | X  |    |    |    |    |
| C4 | O  |    | O  |    |    |    | X  | X  |

|    | D1 | D2 | D3 | D4 | D5 | D6 | D7 | D8 |
|----|----|----|----|----|----|----|----|----|
| C1 |    | I  |    |    | I  | X  |    |    |
| C2 |    |    |    |    | O  |    |    |    |
| C3 | I  | O  | I  | X  |    |    |    |    |
| C4 | O  |    | O  |    |    |    | X  | X  |

|    | TC 1          |        | TC 2   |              |
|----|---------------|--------|--------|--------------|
|    | Res 1         | Res 4  | Res 2  | Res 3        |
| C1 | D2*, D5*, D6  | D6     | D6     | D6           |
| C2 | D5**          |        |        |              |
| C3 | D2**          | D4     | D4     | D1*, D3*, D4 |
| C4 | D7, D8        | D7, D8 | D7, D8 | D1**, D3**   |

|  | D1 | D2 | D3 | D4 | D5 | D6 | D7 | D8 |
|---|---|---|---|---|---|---|---|---|
| C1 |  | O |  |  | O | O |  |  |
| C2 | O | O | O | O |  |  | O | O |

|  | D1 | D2 | D3 | D4 | D5 | D6 | D7 | D8 |
|---|---|---|---|---|---|---|---|---|
| C1 |  | X |  |  | X | X |  |  |
| C2 | X | O | X | X |  |  | X | X |

|  | D1 | D2 | D3 | D4 | D5 | D6 | D7 | D8 |
|---|---|---|---|---|---|---|---|---|
| C1 |  | I |  |  | X | X |  |  |
| C2 | X | O | X | X |  |  | X | X |

|    | TC 1          | TC 2              |
|----|---------------|-------------------|
|    | Res 1         | Res 2             |
| C1 | D2*, D5, D6   | D5, D6            |
| C2 | D2**          | D1, D3, D4, D7, D8 |

|    | D1 | D2 | D3 | D4 | D5 | D6 | D7 | D8 |
|----|----|----|----|----|----|----|----|----|
| C1 | O  | O  |    |    | O  | O  |    |    |
| C2 |    |    |    |    | O  |    |    |    |
| C3 | O  | O  | O  | O  |    |    |    |    |
| C4 | O  |    | O  |    |    |    | O  | O  |

|    | D1 | D2 | D3 | D4 | D5 | D6 | D7 | D8 |
|----|----|----|----|----|----|----|----|----|
| C1 | O  | X  |    |    | X  | X  |    |    |
| C2 |    |    |    |    | O  |    |    |    |
| C3 | X  | O  | X  | X  |    |    |    |    |
| C4 | O  |    | O  |    |    |    | X  | X  |

Fig. 18B

|    | D1 | D2 | D3 | D4 | D5 | D6 | D7 | D8 |
|----|----|----|----|----|----|----|----|----|
| C1 | O  | I  |    |    | I  | X  |    |    |
| C2 |    |    |    |    | O  |    |    |    |
| C3 | I  | O  | I  | X  |    |    |    |    |
| C4 | O  |    | O  |    |    |    | X  | X  |

Fig. 18C

|             | Ch1         |             | Ch2 |             | Ch3         |             | Ch4         |             |
|-------------|-------------|-------------|-----|-------------|-------------|-------------|-------------|-------------|
| Reserved by | C1          | C1          | C2  |             | C3          | C3          | C4          | C4          |
| Free by     | C2          | C2          |     | C2          | C2          | C2          | C2          | C2          |
| C1          | D2*, D5*, D6 | D2*, D5*, D6 | D6 | D6, (D5*)   | D1**        | D1**        | D6, (D5*)   | D6, (D5*)   |
| C2          | D5**        | D5**        |     |             |             |             |             |             |
| C3          | D2**        | D2**        | D4  | D4          | D1*, D3*, D4 | D1*, D3*, D4 | D4          | D4          |
| C4          | D7, D8      | D7, D8      | D7, D8 | D7, D8   | D1**, D3**  | D1**, D3**  | D7, D8      | D7, D8      |

Fig. 18D

|  | Ch1 | | | Ch2 | | | Ch3 | | | Ch4 | | |
|---|---|---|---|---|---|---|---|---|---|---|---|---|
| Reserved by | C1 | C1 | C1 | C2 | | | C3 | C3 | C3 | C4 | C4 | C4 |
| Free by | C2, C4 | C2, C4 | C2 | C2, C4 | C2, C4 | C2 | C2, C4 | C2, C4 | C2 | C2 | C2 | C2, C4 |
| C1 | D2*, D5*, D6 | D2*, D5*, D6 | D2*, D5*, D6 | D6 | D6, (D5*) | D6, (D5*) | D1** | D1** | D1** | D6, (D5*) | D6, (D5*) | D6, (D5*) |
| C2 | D5** | D5** | D5** | | | | | | | | | |
| C3 | D2** | D2** | D2** | D4, (D3*) | D4, (D3*) | D4 | D1*, D3*, D4 | D1*, D3*, D4 | D1*, D3*, D4 | D4 | D4 | D4 |
| C4 | | | D7, D8 | | | D7, D8 | D1**, D3** | D1**, D3** | D1**, D3** | D7, D8 | D7, D8 | D7, D8 |

Fig. 18E

INTERFERENCE HANDLING FOR WIRELESS NETWORKS WITH MULTIPLE COORDINATORS

CROSS-REFERENCE TO PRIOR APPLICATIONS

This application is the U.S. National Phase application under 35 U.S.C. § 371 of International Application No. PCT/EP2019/055398, filed on Mar. 5, 2019, which claims the benefits of European Patent Application No. 18171128.4, filed on May 8, 2018, and European Patent Application No. 18162470.1, filed on Mar. 19, 2018. These applications are hereby incorporated by reference herein.

FIELD OF THE INVENTION

The invention relates to the field of scheduling transmissions in wireless networks, such as—but not limited to—optical communication networks (e.g. LiFi networks), for use in various different applications for home, office, retail, hospitality and industry.

BACKGROUND OF THE INVENTION

LiFi, like Wi-Fi, enables electronic devices like laptops, tablets, and smartphones to connect wirelessly to the internet. Wi-Fi achieves this using radio frequencies, but LiFi achieves this using the light spectrum which can enable unprecedented data and bandwidth. It's important to consider that wireless data is required for more than just our traditional connected devices—today televisions, speakers, headphones, printer's, virtual reality (VR) goggles and even refrigerators use wireless data to connect and perform essential communications. Radio frequency technology like Wi-Fi is running out of spectrum to support this digital revolution and LiFi can help power the next generation of immersive connectivity.

Visible-light communication (VLC) transmits data by intensity modulating optical sources, such as light emitting diodes (LEDs) and laser diodes (LDs), faster than the persistence of the human eye. VLC merges lighting and data communications in applications such as area lighting, signboards, streetlights, vehicles, and traffic signals. The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light for communication.

In the star topology, the communication is established between devices and a single central controller, called the coordinator. In the peer-to-peer topology, one of the two devices in an association takes on the role of the coordinator. In the coordinated topology, multiple devices communicate with multiple coordinators, supervised by a global controller. The global controller has a fixed network link to each coordinator.

An important aspect of the IEEE 802.15.7 standard is the definition of a superframe which contains a beacon, a contention access period (CAP) and a contention free period (CFP) as active part and which may also contain an inactive part. A beacon interval defines the interval between beacons, while a superframe order defines the duration of the active part. The beacon is primarily used for synchronization, but also contains information on the actual structure of the superframe. The CAP is mainly used to establish a connection between a coordinator and a device, while the CFP is used for data transfer. While in the CAP the access of devices is based on carriers sense multiple access (CSMA), in the CFP the access is scheduled by the coordinator by assigning a guaranteed time slot (GTS) to each device.

To scale up a system from one OWPAN to two or more OWPANs, a global controller function has been proposed to handle interference and hand-over between overlapping OWPAN. The global controller or network controller function manages the coordinators, while each coordinator controls its OWPAN. The global controller function can be connected to the coordinators via a separate network.

However, if a global controller function is implemented in a central unit, the user must buy such a unit and interconnect the OWPANs to this unit. This is not always a desired situation. Furthermore, if such central unit fails, or the communication with it fails, the interference handling would fail as well. It would be more convenient if the OWPANs could cooperate such that a new unit is not needed.

A possible solution might be to assign the global controller function to one of the local OWPAN controllers (i.e. in IEEE802.15.7 terms to one of the coordinators). However, this implies additional resource overhead to the coordinators and complicates continuation of the interference handling when the master coordinator is switched off. It also fails if the communication system that connects the coordinators to each other fails.

D1 (US20150078259A1) discloses a solution for reducing interference between wireless networks. The method comprises: acquiring, by an access node of a first wireless network from at least one node of the first wireless network, information on at least one interfering node of a second wireless network; generating, by the access node, mapping information between the node of the first wireless network and said at least one interfering node; and causing, by the access node, transmission of the mapping information to another access node of the second wireless network.

D2 (US20140016478A1) discloses a method, apparatus and computer program product that provide improved detection of overlapping wireless networks. The method, apparatus and computer program product may utilize a processor, such as a processor on a wireless access point, to determine one or more parameters for a scan of a wireless network to identify overlapping networks. Wireless stations may utilize the parameters to determine the content of a scan report generated from a scan of the wireless network. The wireless stations may further utilize the parameters to determine which values should be monitored and/or recorded during the scan of the network. The wireless stations may respond to the access point with results corresponding to the parameters requested by the access point, and the access point may use the results to determine channel access parameters for other devices on the network, such as the wireless stations.

SUMMARY OF THE INVENTION

It is an object of the present invention to provide a solution for handling interference in large wireless networks with a plurality of OWPANs without requiring a global controller function.

This object is achieved by a system as claimed in claim 1, an apparatus as claimed in claim 2 or 10, by a method as claimed in claim 18 or 21.

According to a first aspect, a system is provided for handling interference in a wireless network comprising at least two coordinators and a plurality of devices selectively associated to a respective one of the coordinators, wherein at least one of the coordinators is adapted to determine an own reserved period of a global time frame used for the transmissions and is further adapted to advertise its identifier and its determined own reserved period, wherein at least one of the devices is adapted to check whether an advertisement with an identifier has been received from a neighboring coordinator, to generate an interference report which comprises at least one of an identifier of a local coordinator and the identifier of the neighboring coordinator, and to report the interference report to the local coordinator or to the neighboring coordinator or to broadcast the interference report to all coordinators in its reach; and wherein the at least one coordinator is further adapted to determine presence of a neighboring coordinator and its reserved period based on at least one of an interference report received from a reporting device of the devices and a report of the neighboring coordinator, and to control transmissions by at least one of limiting communication with the reporting device to its own reserved period in the global time-frame and limiting communication with other ones of the devices by excluding from the global time frame the reserved period of the neighboring coordinator reported by the reporting device or by the neighboring coordinator; and wherein the wireless network is based on optical communication with line-of-sight character.

According to a second aspect directed to a coordinator device, an apparatus is provided for handling interference in a wireless network comprising at least two coordinators and a plurality of devices selectively associated to a respective one of the coordinators, wherein the apparatus is adapted to determine an own reserved period of a global time frame used for the transmissions and to advertise its identifier and its determined own reserved period, wherein the apparatus is further adapted to determine presence of a neighboring coordinator and its reserved period based on at least one of an interference report received from a reporting device of the devices and a report of the neighboring coordinator, and to control transmissions by at least one of limiting communication with the reporting device to its own reserved period in the global time-frame and limiting communication with other ones of the devices by excluding from the global time frame the reserved period of the neighboring coordinator reported by the reporting device or by the neighboring coordinator.

Thus, if a device reports to the local coordinator and the system relies on a separate network via which the local coordinator reports to the neighboring coordinator, then it is sufficient that the device only reports the identifier of the neighboring coordinator to the local coordinator. As an example, addressing the local coordinator can be implicit by using e.g. a time slot that the local coordinator has scheduled for local reporting. It is therefore not necessary to use the identifier of the local coordinator for addressing it. Therefore, the device may report the identifiers of local and neighboring coordinators to both coordinators, or the device may report only the identifier of the neighboring coordinator to the local coordinator and the local coordinator may then report its identifier and the identifier of the reporting device to the neighboring coordinator, or the device may report only the identifier of the local coordinator to the neighboring coordinator and the neighboring coordinator may then report its identifier and the identifier of the reporting device to the local coordinator.

A coordinator should thus be provided with information about the presence of a neighboring coordinator and its reserved period and whether a device is in the reach of the neighboring coordinator. The coordinator may obtain information about the presence and the reserved period of the neighboring coordinator from the reporting device, or it may obtain information about the presence of the neighboring coordinator from the reporting device and information about the reserved period from the neighboring coordinator via a separate network, or it may obtain information about the presence and the reserved period of the neighboring coordinator from the neighboring coordinator via a separate network.

In case of the above last option, the coordinator also needs to know which device has detected the neighboring coordinator, to be able to control the transmissions. A coordinator could however also inform a neighboring coordinator about a detected reporting of a device. This means that the coordinator does not need to get the report directly from the device, it could also rely on a report received from the neighboring coordinator via the separate network. In this case, the report from the neighboring coordinator may contain its identifier and its reserved period (i.e. its advertisement information), but also a device identifier of the device that has reported to the neighboring coordinator.

Accordingly, a cooperation between coordinators of the wireless network is proposed based on a global time frame to determine non-interfering local time schedules, whereby the coordinators rely on interference reports from the devices in the overlapping areas and apply a small number of simple rules. The proposed cooperative interference detection and handling is simple, scalable, independent from a central global coordinator unit and suitable for balanced and unbalanced traffic.

Moreover, because the coordinators determine the interference handling locally, they can make fast decisions. Hence, there is no additional delay for first reporting to a central global controller and waiting for decisions of this central global controller. After receiving a report from a neighboring coordinator, the coordinator can immediately decide.

Further the proposed interference detection and handling suits good for scheduling of both balanced as a well unbalanced traffic.

According to a first option of the first and second aspects, the at least two coordinators may be synchronized so that start time and repetition time of the global time frame is equal for the at least two coordinators. This measure ensures that a communication channel is provided, which can be accessed in multiplexed manner by coordinators and associated devices.

According to a second option which can be combined with the above first option, the apparatus may be preconfigured to own a predetermined time period of the global time frame, wherein the own reserved period may be provided within the predetermined time period. Thereby, a predetermined portion of the global time frame is allocated to and reserved for each coordinator to prevent collisions with interfering devices. In a specific example of the second option, the apparatus may be adapted to extend the own reserved period up to the end of the predetermined time period. This measure provides more flexibility in allocating time slots to associated devices.

According to a third option which can be combined with the above first or second option, the apparatus may be adapted to apply within the own reserved period at least one of an advertisement period for broadcasting its presence, a report period in which an associated device reports interference, a schedule period for providing a schedule of slots for communication with its associated devices, and an association period as an opportunity for devices to associate. Thereby, various kinds of transmissions required for the proposed interference detection and handling can be scheduled within the reserved period to ensure that these transmissions are not influenced by interference.

According to a fourth option which can be combined with any of the above first to third options, the apparatus may be adapted to allocate less time slots in the own reserved period for non-interfering devices and to compensate that by allocating more time slots in other time periods of the global time frame for the non-interfering devices to free up time slots in the own reserved period for allocation to interfering devices. Thus, time slots can be shifted within the global time frame to improve interference handling.

According to a fifth option which can be combined with any of the above first to fourth options, the apparatus may be adapted to additionally determine at least one own free period of the global time frame and to advertise the determined at least one own free period by communicating via a device that has detected a neighboring coordinator or via a separate network, and wherein the apparatus is further adapted to control transmissions by at least one of limiting communication with the reporting device to its own reserved period and to intersections of free periods of neighboring coordinators and limiting communication with other ones of the devices by excluding its own free period and the reserved period reported by the reporting device or by the neighboring coordinator. In the fifth option, free periods may be communicated in addition to reserved periods. Coordinators may thus communicate free periods to their neighboring coordinators in addition to their reserved periods. This allows a local coordinator to schedule communication with a local interference device also in the intersection of free periods of neighboring coordinators. The coordinator does not have to wait for a device that has detected a neighboring coordinator before advertising a free period. It can advertise a free period any time, e.g., together with its identifier and reserved period.

According to a sixth option which can be combined with any of the above first to fifth options, the apparatus may be adapted to advertise the own reserved period by at least one of communicating via a device that has detected another coordinator or via a separate network. Thus, the apparatus may for example communicate the presence of a neighboring coordinator via a device and the timing information (e.g. reserved and/or free periods) via a separate network, or the apparatus may communicate both neighboring coordinator presence and timing information via a device, or the apparatus may communicate both neighboring coordinator presence and timing information via a separate network. The latter may require a coordinator to determine the position of the device to find out if the device is in the reach of a neighboring coordinator. The presence advertisement and reporting via a device is related to the actual position of the device. For the detection if a device is in the reach of multiple coordinators, the device is preferably involved.

According to a third aspect directed to a device that can be associated to a coordinator, an apparatus is provided for handling interference in a wireless network comprising at least two coordinators and a plurality of devices selectively associated to a respective one of the coordinators, wherein the apparatus is adapted to check whether an advertisement with an identifier has been received from a neighboring coordinator, to generate an interference report which comprises at least one of an identifier of a local coordinator and the identifier of the neighboring coordinator, and to report the interference report to the local coordinator or to the neighboring coordinator or to broadcast the interference report to all coordinators in its reach.

In the case of the above fifth option, the interference report may also comprise the reserved period and optionally also the at least one own free period of the local coordinator and the neighboring coordinator.

According to a seventh option which can be combined with any one of the above first to sixth options, the apparatus may be adapted to detect one of the at least two coordinators based on its advertisement, to align to the global time frame provided by the detected coordinator, and to get associated with the detected coordinator by using an existing protocol. Thus, new devices that are added to the network are allocated to at least one coordinator as a new associated device and thus can be involved in the proposed interference detection and handling process.

According to an eighth option which can be combined with any one of the above first to seventh options, the apparatus may be adapted to generate an interference report which comprises the identifier, the reserved period and optionally at least one free period of the global time frame of a local coordinator and the neighboring coordinator, and to report the interference report to the local coordinator or to broadcast the interference report to all coordinators in its reach.

According to a ninth option which can be combined with any one of the above first to eighth options, the wireless network may comprise at least two overlapping optical wireless personal area networks, OWPANs, each controlled by one of the at least two coordinators, wherein each OWPAN provides connections for the plurality of devices. Thereby, improved interference detection and handling can be provided for large networks with a plurality of smaller personal area networks each controlled by a respective coordinator.

According to a tenth option which can be combined with any one of the above first to ninth options, the at least two coordinators may share a medium for downlink communication in the wireless network and the plurality of devices may share a medium for uplink communication in the wireless network. Thereby, uplink and downlink communication can be separated to reduce interference between uplink and downlink transmissions. In a specific example of the tenth option, at least one of a free-medium indication and a busy-medium indication is used to control an access to an uplink medium. This measure reduces probability of collisions significantly, According to a fourth aspect directed to a procedure at a coordinator device, a method is provided for handling interference in a wireless network comprising at least two coordinators and a plurality of devices selectively associated to a respective one of the coordinators, wherein the method comprises:

determining at one of the at least two coordinators an own reserved period of a global time frame used for transmissions;

advertising by the coordinator its presence and its determined own reserved period;

determining presence of a neighboring coordinator and its reserved period based on at least one of an interference report received from a reporting device of the devices and a report of the neighboring coordinator; and controlling transmissions by at least one of limiting communication with the reporting device to its own reserved period in the global time-frame and limiting communication with other ones of the devices by excluding from the global time frame the reserved period of the neighboring coordinator reported by the reporting device or by the neighboring coordinator;

and wherein the wireless network is based on optical communication with line-of-sight character.

According to a fifth aspect directed to a procedure at a device that can be associated to a coordinator, a method is provided for handling interference in a wireless network comprising at least two coordinators and a plurality of devices selectively associated to a respective one of the coordinators, wherein the method comprises:

checking whether an advertisement with an identifier has been received from a neighboring coordinator;

generating an interference report which comprises at least one of an identifier of a local coordinator and the identifier of the neighboring coordinator, and reporting the interference report to the local coordinator or to the neighboring coordinator or broadcasting the interference report to all coordinators in its reach;

and wherein the wireless network is based on optical communication with line-of-sight character.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the system of claim 1, the apparatus of claim 2 or 10, the method of claim 18 or 21, may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 7 shows a schematic architecture of a LiFi network with four coordinators and eight devices according to a third embodiment;

FIGS. 8A to 8D show respective tables for detection, association, interference and interference handling according to the third embodiment;

FIG. 17 shows a schematic architecture of a LiFi network with four coordinators and eight devices according to a seventh embodiment; and FIGS. 18A to 18E show respective tables for detection, association, interference and interference handling according to the seventh embodiment.

DETAILED DESCRIPTION OF EMBODIMENTS

Embodiments of the present invention are now described based on a LiFi network environment with a plurality of overlapping OWPANs.

Figure 1:
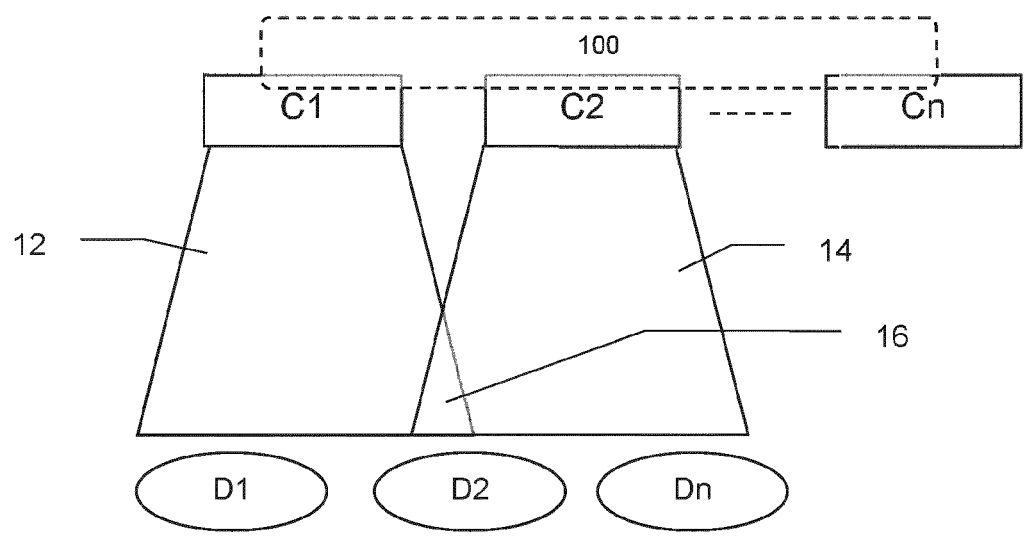
FIG. 1 shows a schematic architecture of a LiFi network with distributed global control by cooperating coordinators according to various embodiments.

FIG. 1 shows the schematic architecture with the plurality of overlapping OWPANs with their respective coverage areas 12, 14. Each OWPAN is controlled by a respective coordinator C1 to Cn and the OWPANs provide connections for a plurality of devices D1 to Dn.

The OWPANs can be distributed over an area in which they don't interfere with each other when they are sufficiently separated in this area. But, if two OWPANs are near to each other, they will have an overlapping area 16 in which they can interfere. By providing a distributed cooperation functionality 100 among cooperating coordinators C1 to Cn, the system becomes independent of a central or selected unit, easily scalable and robust.

According to the proposed distributed coordination approach of various embodiments, a dedicated communication can be provided to exchange relevant information on interference and timing. Thereby, the coordinators C1 to Cn can be informed if and when their schedules interfere. Accordingly, the ITU G.9961 standard may be enhanced by setting up an inter-domain communication channel (IDCC). However, since such a channel is based on CSMA, it may not work well for a LiFi network. The LiFi network is a wireless network which is based on optical communication with line-of-sight character, instead of RF communication. Therefore, the coordinators C1 to Cn do no "see" each other. By contrast, in RF communication, access-points can be aware of each other's presence and so have a more direct indication if they are neighbors. However, the coordinators C1 to Cn are often mounted in the ceiling and have thus a limited angle to transmit/receive data and are therefore hidden to each other. They cannot communicate with each other via the LiFi medium and so cannot build a neighborhood relationship directly to handle interference. The same applies for the devices D1 to Dn that have their light source(s) (e.g. LED(s)) and sensor(s) oriented towards the ceiling. Without a line-of-sight connection the devices have no direct LiFi communication and are therefore hidden to each other.

It is assumed that the coordinators C1 to Cn are synchronized and have an aligned global time-frame, meaning that the start and repetition time of the global time-frame is (nearly) equal for all coordinators C1 to Cn. As an example, in case of a powerline communication, synchronization may depend on zero crossings of the 50/60 Hz power signal.

It is further assumed that each of the coordinators C1 to Cn is pre-configured to be the owner of a time chunk of the global time-frame. This can be realized during installation or by a management system in which the positions of the OWPANs are known. In case such pre-configuration is not possible, a process may be applied to assign ownership of channels.

It is further assumed that the coordinators C1 to Cn of the LiFi network share a medium for downlink communication and the devices D1 to Dn in the LiFi network share a medium for uplink communication and that (high level) interference handling is arranged via time division.

Each of the coordinators C1 to Cn handles a part of the global control function (i.e. the distributed cooperation functionality 100) that is relevant for this coordinator by cooperating with its neighboring coordinators to avoid interference. For that purpose, a coordinator arranges a medium access schedule that does not interfere with its neighbors. Coordinators are defined as neighboring coordinators if they detect the presence of the same one of the devices D1 to Dn.

Figure 2:
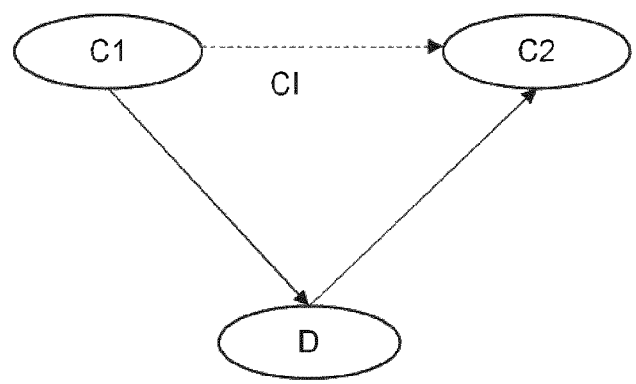
FIG. 2 shows a schematic diagram indicating communication between neighboring coordinators in an overlapping area.

FIG. 2 shows a schematic diagram indicating communication between neighboring coordinators in an overlapping area.

This invention focuses on the cooperation of neighboring coordinators C1 and C2 for a commonly detected device D by (virtually) exchanging relevant cooperation information CI between the coordinators via this device D in the overlapping area 16. The following definitions are used in various embodiments. When viewed from a local coordinator point of view, an interference device (or interference reporting device) corresponds to a device that has detected presence of more than one coordinator, a neighboring coordinator corresponds to a coordinator of which presence is detected by and reported from a device to the local coordinator, a local device corresponds to a device associated to the local coordinator, a neighboring device corresponds to a device associated to a neighboring coordinator, a local reserved period corresponds to a period reserved by a local coordinator for exclusive communication with devices, and a neighbor reserved period corresponds to period reserved by a neighboring coordinator for exclusive communication with devices.

Figure 3:
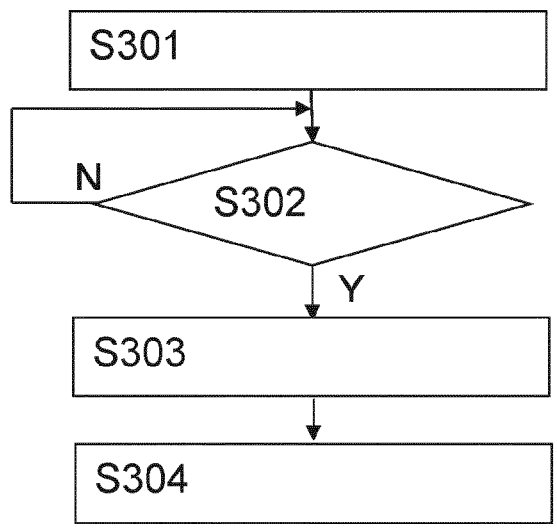
FIG. 3 shows a flow diagram of a cooperative interference detection and handling procedure at a coordinator according to a first embodiment.

FIG. 3 shows a flow diagram of a cooperative interference detection and handling procedure at a coordinator according to a first embodiment.

Each coordinator may (dynamically) determine a reserved period in its assigned time chunk of the global time frame for exclusive use. This reserved period may depend on the number of associated devices and the required minimum bandwidth for communication. The coordinator may further use other time chunks of the global time frame depending on the cooperative interference handling.

In step S301, the coordinator advertises its presence and its determined reserved period of the global time-frame. Then, in step S302, the coordinator waits for the receipt of an interference report from an associated (local) device or a neighboring device. The coordinator may also need the interference report from a neighboring device to exclude communication of its local devices from the reserved period of the neighboring coordinator. Such an interference report comprises an identifier and a reserved period of the global time frame of a detected neighboring coordinator and is broadcast by the associated device to all coordinators in its reach. Thus, a cooperative interference detection is provided by steps S301 and S302.

If the coordinator determines in step S302 that an interference has been reported by a device, the coordinator limits in step S303 the access of and thus the communication with the local device that has detected the presence of the neighboring coordinator to its own reserved period in the global time-frame. Furthermore, in step S304, the coordinator may also limit the access of and thus the communication with other local devices by excluding the reserved period reported by the neighboring device. It is noted that the local device is associated to the coordinator and that the neighboring device is associated to the neighboring coordinator. Thus, a cooperative interference handling is provided by steps S303 and S304.

The procedure of FIG. 3 can be repeated continuously or intermittently.

Figure 4:
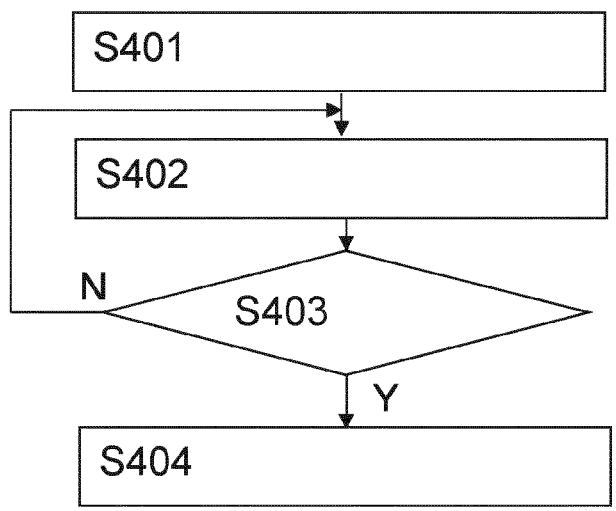
FIG. 4 shows a flow diagram of a cooperative interference detection and handling procedure at an associated device according to the first embodiment.

FIG. 4 shows a flow diagram of a cooperative interference detection and handling procedure at an associated device according to the first embodiment.

In an initial step S401, the device detects a coordinator based on its advertisement and gets associated with the coordinator. Then, the device checks in step S402 for the receipt of any advertisements. When an advertisement has been received, the associated device checks in step S403 whether the advertisement has been broadcast by a neighboring coordinator. If not, the procedure jumps back to step S402. If, however, an advertisement of a neighboring coordinator has been detected in step S403, the associated device generates an interference report which comprises the identifiers and the reserved periods of the global time frame of the detected local coordinator and the detected neighboring coordinator and broadcasts the interference report to all coordinators in its reach. Thus, a cooperative interference handling is provided by steps S402 to S404.

It is noted that the neighboring coordinator may also need to get the identifier and the reserved period of the local coordinator to be able to limit the access by excluding the reserved period of the local coordinator. The local coordinator is a coordinator to which a concerned device is associated, and the neighboring coordinator is a coordinator to which the concerned device is not associated.

The procedure of steps S402 to S404 can be repeated continuously or intermittently.

Thus, an associated device detecting a neighboring coordinator may need to inform both coordinators on each other's information, because the neighboring coordinator may not have an associated device detecting the local coordinator and so may not get information of a local coordinator. Therefore, the local or associated device that detects a neighboring coordinator may need to report information of the neighboring coordinator to the local coordinator and information of the local coordinator to the neighboring coordinator.

It is also noted that when an associated device sends an interference report to the local coordinator that the neighboring coordinator may receive this report as well and use it for interference handling.

Figure 5:
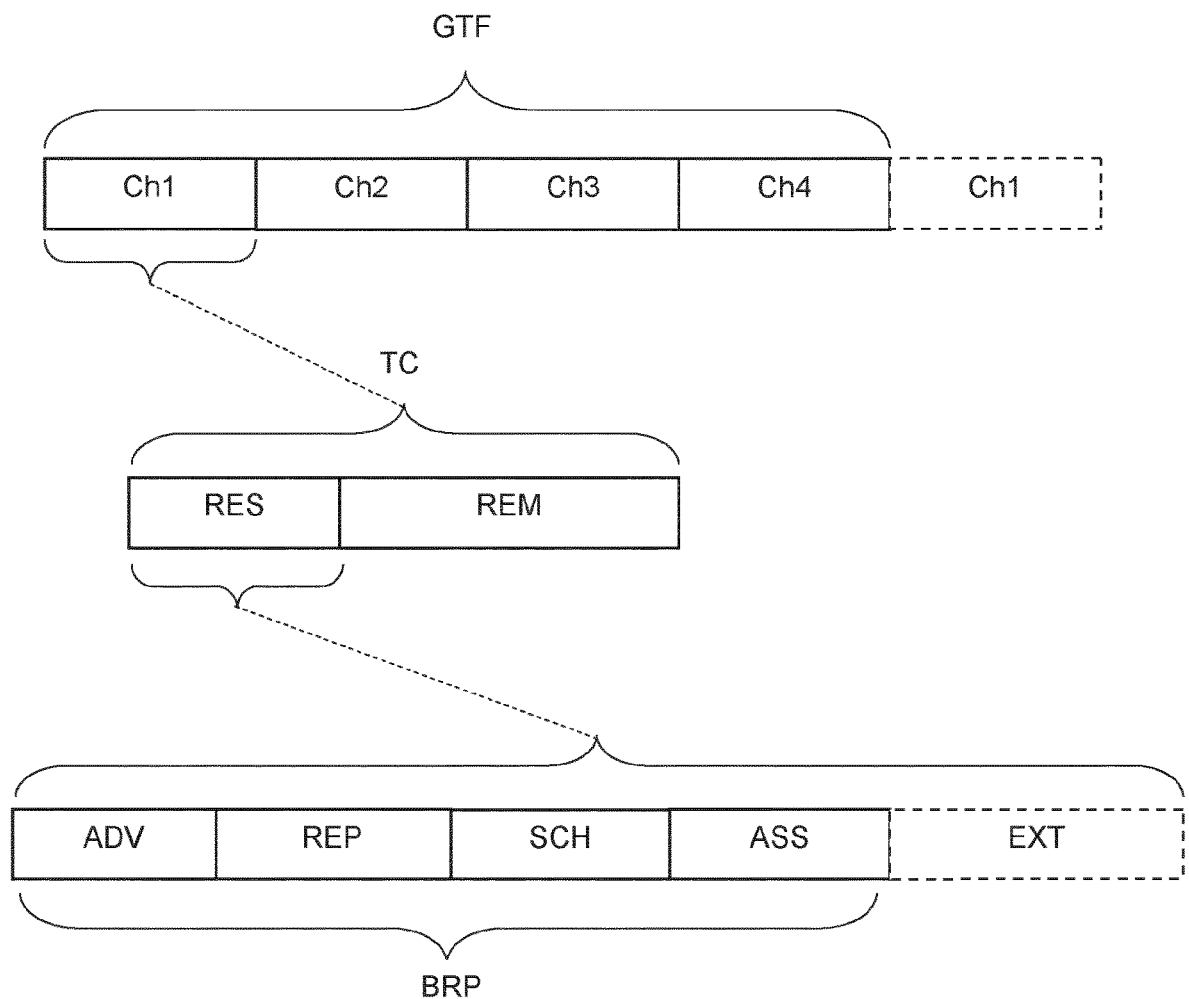
FIG. 5 shows a global time frame structure with a reserved period according the first embodiment.

FIG. 5 shows a global time frame structure with a reserved period according the first embodiment. A plurality of time chunks Ch1 to Ch4 are defined in the global time frame (GTF). Each of these time chunks is allocated to a LiFi sub-network or an OWPAN. Each time chunk (TC) is divided into two periods: a reserved period (RES) and a remaining period (REM).

The reserved period is meant to assure that communication in this period is not interfered by communication of neighboring coordinators or devices. A neighboring coordinator is dis-allowed to schedule communication in this period. In the remaining period, a neighboring coordinator is allowed to schedule communication.

Within the reserved period, the coordinator applies a dedicated coordinator advertisement period (ADV) in which it broadcasts its presence to devices in its reach. The advertisement period is located at a fixed position in the time chunk to allow for a quick recognition by a receiving device. Furthermore, within the reserved period, the coordinator provides information on its reserved period. This information can be provided in the advertisement period or in a separate period (e.g., a schedule period (SCH)).

Furthermore, within the reserved period, the coordinator may further apply a dedicated device report period (REP) in which an associated device reports interference. The report period may be located at a fixed position in the time chunk to allow for a quick recognition by a neighboring coordinator. Moreover, within the reserved period, an associated device may provide information on the local reserved period and/or a neighbor reserved period. This information can be provided in the report period as well.

Additionally, within the reserved period, the coordinator may further apply a schedule period (SCH) in which it provides a schedule of slots of the global time frame intended for communication with its associated devices. Although the advertisement period and the schedule period are illustrated as two separate periods they may be combined into a single fixed period.

Finally, within the reserved period, the coordinator may further schedule an associated period (ASS) as an opportunity for devices to associate. Although the report period and the associated period are illustrated as two separate periods they may be combined into a single fixed period.

The coordinator may restrict the above described periods (advertise, report, schedule, associate) to a basic reserved period (BRP) and may dynamically extend the reserved period by adding an extension period (EXT) for other purposes, e.g. for other types of communication for which interference handling is needed.

The basic reserved period may have a fixed duration. To prevent interference in the basic reserved period and to safeguard the exchange of the elementary communication between coordinator and devices, each coordinator dis-allows any communication to/from its associated devices in any other basic reserved period than its own.

Regarding reporting by devices, a device may report in the local report period, whereby neighboring coordinators are receiving the report as well. This option can be advantageous, because it enables more control to the coordinator for guiding or restricting the access to the report period.

As an alternative, a device may report in the local report period and in the neighbor report period(s) separately.

Access to the report period and/or association period may be primarily contention-based but may be guided or restricted by the coordinator. The coordinator may select a subset of devices to access a certain slot in the report period. This may reduce the probability of collisions. The coordinator may provide free-medium and/or busy-medium indications to help devices to determine if the uplink medium is free or already occupied. Thus, the free-medium indication and/or the busy-medium indication can be used to control an access to the uplink medium. This can reduce the probability of collisions significantly, because devices cannot sense the carrier of other devices and therefore cannot rely on CSMA.

Figure 6:
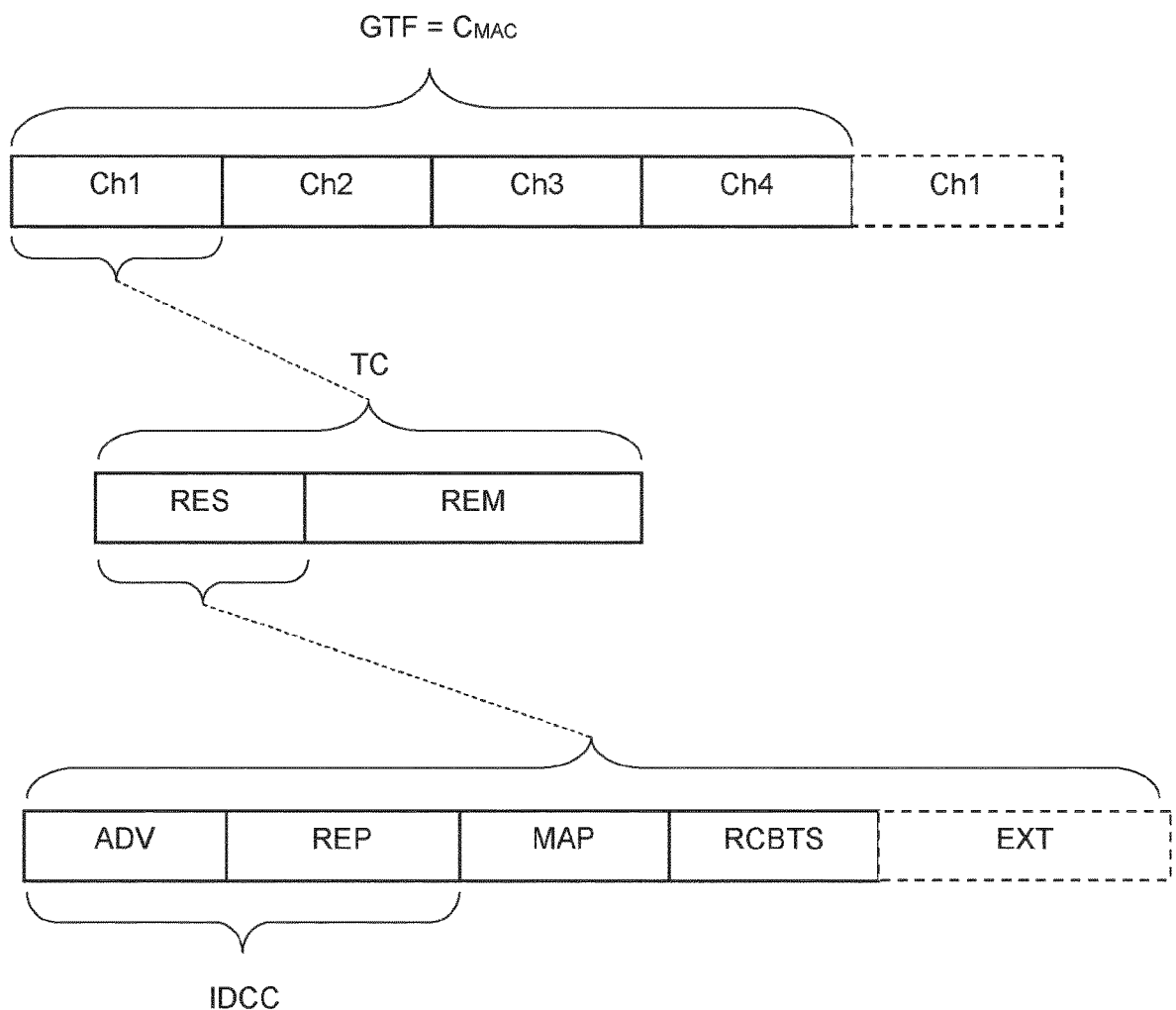
FIG. 6 shows a global time frame structure with a reserved period according a second embodiment.

FIG. 6 shows how a global time frame structure according to a second embodiment, that can be mapped to an ITU G.9961 Medium Access Control (MAC) cycle.

When applying the ITU G.9961 standard for the implementation of a LiFi network, a coordinator gets the role of a domain master (DM) node and a device the role of a non-DM node. The global time frame can be regarded as the MAC cycle, whereby each DM node obeys to the scheduling of transmission opportunities TXOPs according to various embodiments. For powerline communication, ITU G.9961 defines an inter-domain communication channel (IDCC) period. The roles for publishing and detecting neighboring domain interference mitigation (NDIM) information in the IDCC period can be as follows. A coordinator in its role as DM node publishes MAP-D presence messages. A device monitors the network for the appearance of MAP-D presence messages and reports the detection of a neighbor domain presence message to its coordinator.

An IDCC period can be regarded as the first part of a time chunk and can be split into an advertisement period and a reporting period. The schedule of the MAC cycle is represented by MAP and the association period is represented by the registration contention-based time slot (RCBTS).

When not using the IDCC period, the coordinator in the role of the DM node can schedule a dedicated fixed contention-free transmission opportunity (CFTXOP) as advertisement period in the reserved part of its time chunk. This could well be the same CFTXOP as for the MAP. In addition, the coordinator can schedule a dedicated fixed shared transmission opportunity STXOP (which contains at least one contention-based time slot) as reporting period in the reserved part of its time chunk.

An association (e.g. step S401 of FIG. 4) is required when a device detects a coordinator (e.g. based on its advertisement) and wants to participate in the related OWPAN. To achieve this, the device first aligns to the global time frame provided by the coordinator and request the coordinator to associate using an existing protocol (e.g. ITU G.9961). It thereby for example makes use of a broadcasted schedule (e.g. MAP) to find the association period (e.g. the RCBTS). The decision for this request is done at the device and may be based on the quality of the received signal (e.g. the signal-to-noise (S/N) ratio) and/or input from the user. The decision for accepting or rejecting is done at the coordinator and may be based on the available bandwidth and/or authentication.

After successful association, the coordinator gives the device permission to report interferences.

From a coordinator's point of view, a local device corresponds to a device associated to the local coordinator, and a neighboring device corresponds to a device associated to a neighboring coordinator:

As explained above in connection with FIGS. 3 and 4, both coordinators and devices apply an interference detection process that always runs. Each coordinator advertises its identifier and its reserved period at every global time frame cycle.

Each local device that detects the presence of a neighboring coordinator reports interference as soon as possible by sending the identifier and the reserved period of the detected neighboring coordinator(s) to its local coordinator and the identifier and reserved period of its local coordinator to the detected neighboring coordinator(s). It may do that with multiple messages but preferably as a single broadcast message to all coordinators in its reach.

Cooperative Interference handling is then achieved in that a coordinator maintains an interference list containing local devices that interfere with a neighbor OWPAN (local interference devices) and neighboring devices that interfere with the local OWPAN (neighbor interference devices). Each entry in the list may contain a device identifier, a device detection time and a reserved period reported by the device. Each time a coordinator receives an interference report from a device, it updates the corresponding list, either by adding the device as a new entry to the list or updating the entry for the device that is already in the list. The coordinator may remove an entry from the list if the report time of the device is older than a pre-defined time.

Furthermore, a coordinator is free to schedule time slots for communication with its local devices in the reserved period of its own (pre-configured) time chunk.

However, a coordinator may never schedule any time slots in the basic reserved period of any other time chunk (any time chunk not owned by the coordinator, but by another coordinator) to ensure that the interference detection process runs without interference.

Initially, a coordinator only schedules slots in the reserved period of its own time chunk. However, if it detects no interference with a neighboring OWPAN (i.e., the interference list is empty), the coordinator may schedule time slots in the other time chunks as well (except for the basic reserved period and, if known, any extended reserved period (s) of these time chunks).

Once the coordinator detects interference with a neighboring OWPAN (i.e., the interference list is not empty), it may apply at least one of the rules that for each local interference device in the list, the coordinator limits communication with this device to its local reserved period, and for each neighboring interference device in the list, the coordinator limits communication with all its local devices by excluding the reserved period reported by this neighboring device.

It is noted that the coordinator has the freedom to scale the extended reserved period up to the end of its allocated time chunk. This allows some freedom to allocate additional time slots in the reserved period to local interference devices if their number or traffic demand grows. The coordinator may also decide to allocate less time slots in the reserved period for local non-interfering devices and compensate that by allocating more time slots in other time chunks for local non-interfering devices to free up time slots in the reserved period for allocation to local interference devices.

Figures 7, 8A:
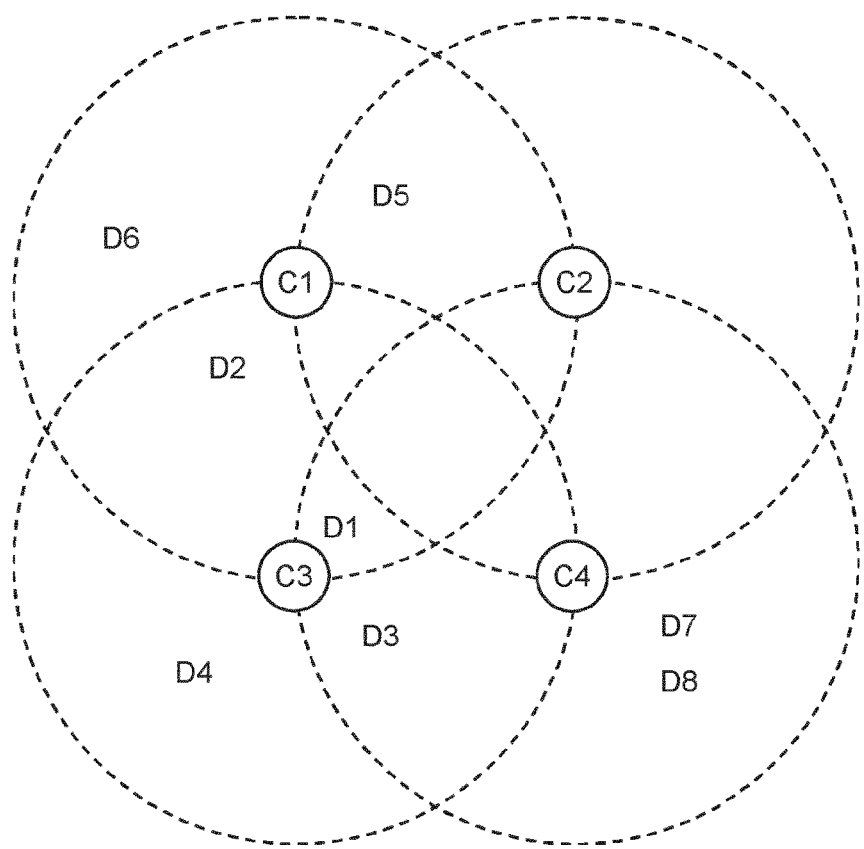

FIG. 7 shows a schematic architecture of a LiFi network with four coordinators C1 to C4 and eight devices D1 to D8 according to a third embodiment. Each dashed circle indicates the area that an OWPAN spans. Some devices D1, D2, D3 and D5 are located in an overlapping area while other devices D4, D6, D7 and D8 are located in non-overlapping areas.

In the following respective tables for detection, association, interference and interference handling according to the third embodiment are explained with reference to FIGS. 8A to 8D.

FIG. 8A shows a table that illustrates the detection of coordinators by the devices D1 to D8, wherein a table entry "O" indicates that the device of a column detects the coordinator of the respective row. As an example, device D1 detects the coordinators C1, C3 and C4.

FIG. 8B shows a table that illustrates the association of devices to coordinators, wherein a table entry "X" indicates that the device of a column is associated to the coordinator of the respective row. As an example, device D1 is associated to the coordinator C3.

FIG. 8C shows a table that illustrates the interference detection of local (associated) devices, wherein a table entry "I" indicates that the device of a column associated to the coordinator of the respective row has detected an interference (and reported the interference to the coordinators in its reach). As an example, device D2 associated to coordinator C1 has detected coordinator C3.

Finally, FIG. 8D shows a table that illustrates the scheduling that each coordinator applies to handle interference, wherein the columns of the table relate to the different successive time chunks TC 1 to TC 4. For simplicity, it is hereby assumed in this illustration that each coordinator has reserved the maximum time in its own time chunk (Res1 to Res4). Moreover, the marking "*" indicates a local device for which communication is restricted to the local reserved period, and the marking "**" indicates a neighboring device for which communications is restricted to the neighbor reserved period and communication with local devices is excluded in this reserved period.

As a first rule of interference handling, a coordinator restricts communication with local devices that have detected a neighboring coordinator to the local reserved period. As an example, the coordinator C1 restricts communication with devices D2 and D5 to the reserved period 1 (Res 1) of the first time chunk TC 1. The coordinator C3 restricts communication with devices D1 and D3 to the reserved period 3 (Res 3) of the third time chunk (TC 3).

As a second rule of interference handling, a coordinator restricts the communication with local devices by excluding the reserved period reported by a neighboring device. As an example, the coordinator C1 excludes communication to local devices in reserved period 3 (Res 3) of the third time chunk (TC 3), the coordinator C2 excludes communication to local devices in reserved period 1 (Res 1) of the first time chunk (TC 1), the coordinator C3 excludes communication to local devices in reserved period 1 (Res 1) of the first time chunk (TC 1), and the coordinator C4 excludes communication to local devices in reserved period 3 (Res 3) of the third time chunk (TC 3).

Figure 9:
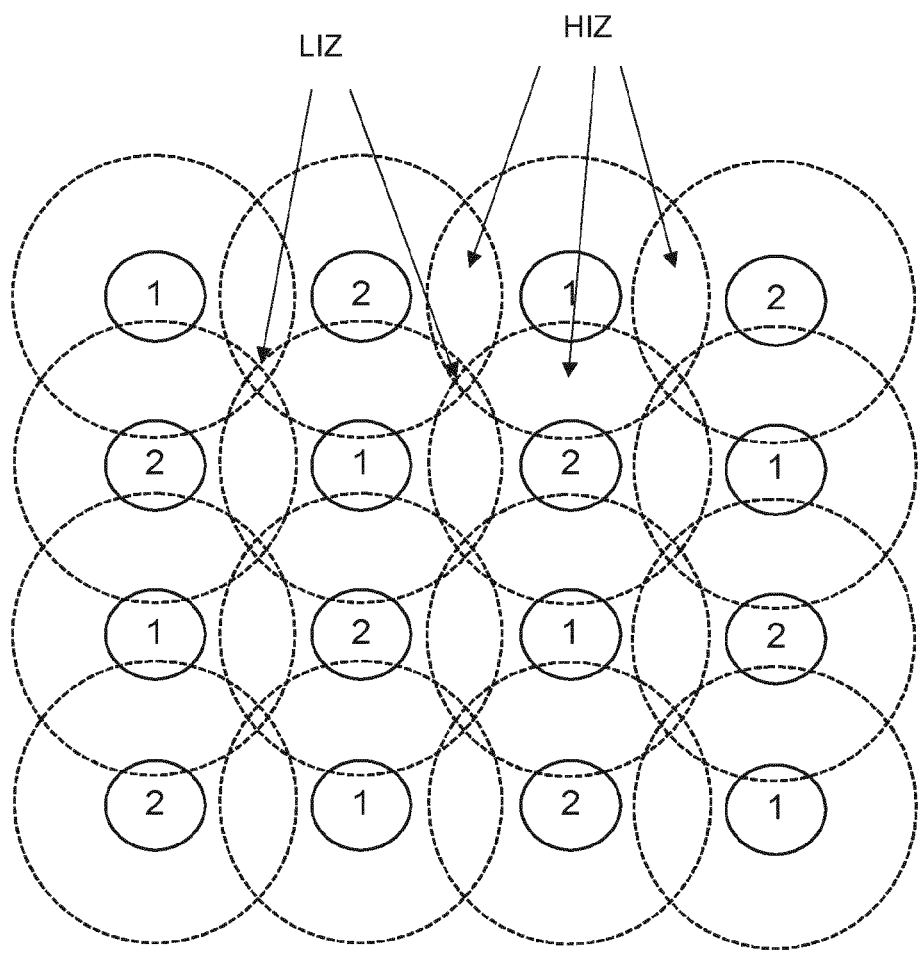
FIG. 9 shows an exemplary floor plan of multiple OWPANs with low and high interference zones according to a fourth embodiment.

FIG. 9 shows an exemplary floor plan of multiple OWPANs with low and high interference zones according to a fourth embodiment.

For this network the global time frame can be divided into two time chunks and each second coordinator is assigned to be owner of a different time chunk. The low interference zones (LIZ) may be handled e.g. by using different preambles and need no division in time. The high interference zones (HIZ) may be handled by time-division. The assignment of time chunks to coordinators may be arranged such that they apply different time chunks for the high interference zones.

Figure 10:
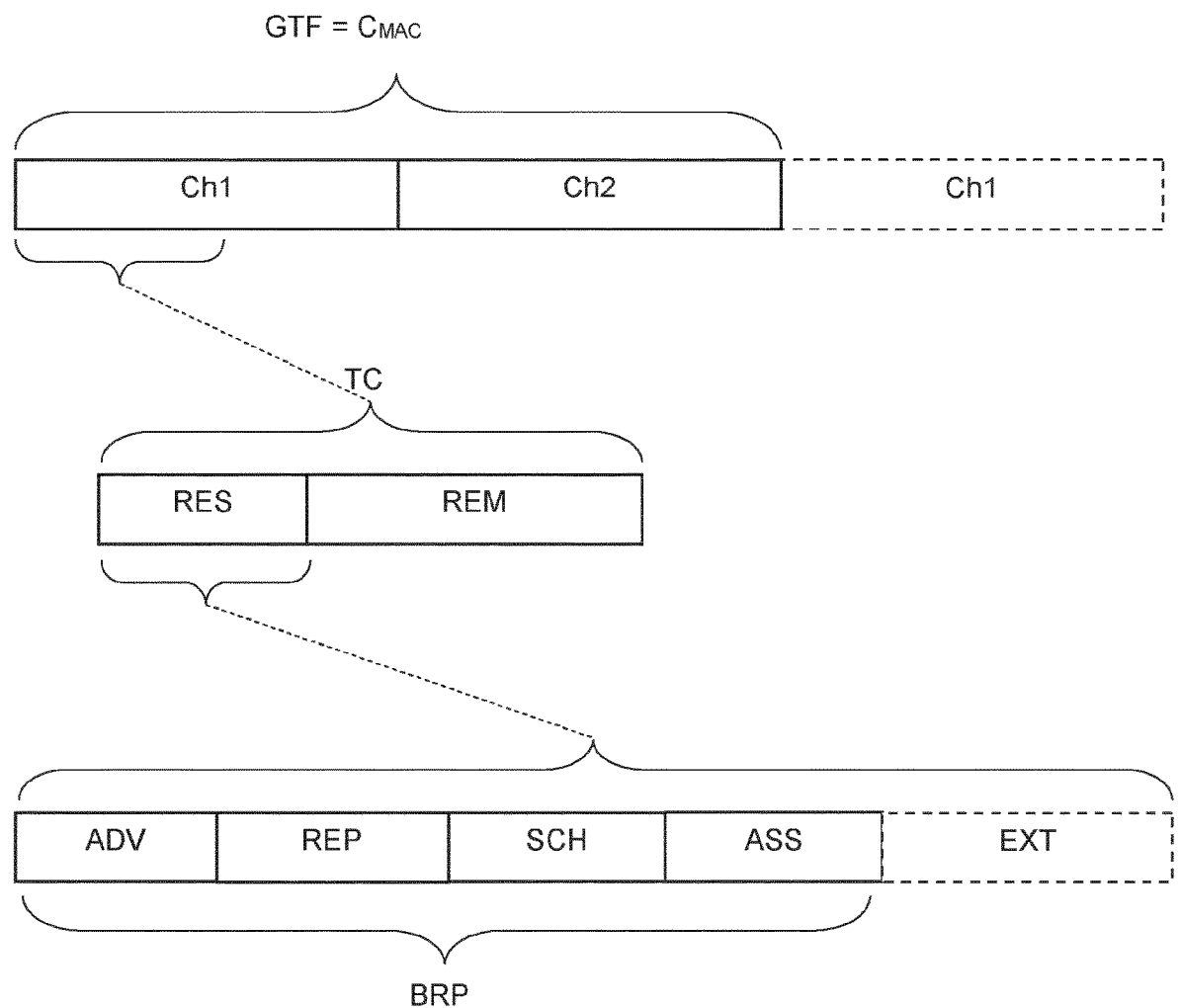
FIG. 10 shows a global time frame structure with two time chunks according the fourth embodiment.

FIG. 10 shows a global time frame structure with two time chunks Ch1 and Ch2 according the fourth embodiment. This global time frame fits to the LiFi network of FIG. 9 and its fields correspond to those described in connection with FIG. 5 and are not described again here.

Figures 11, 12A, 12B, 12C:
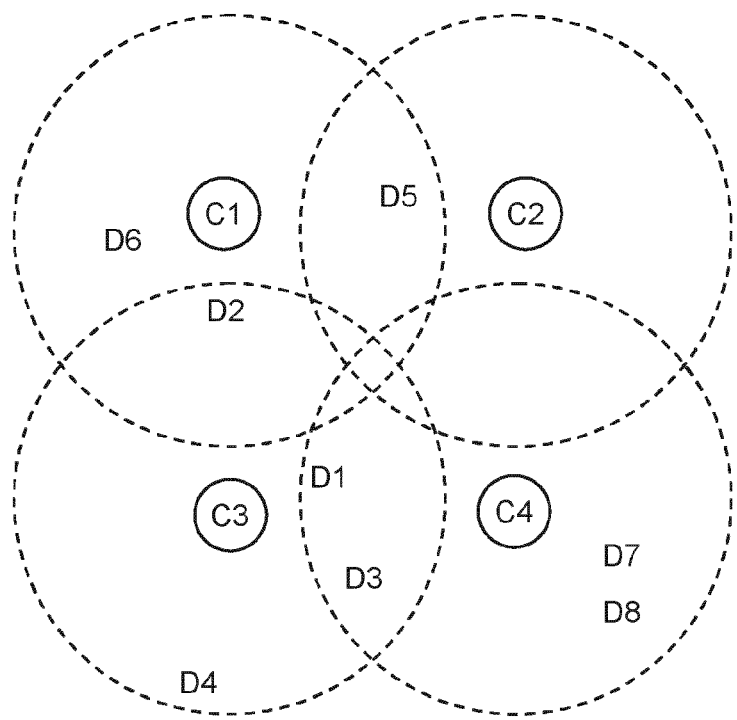
FIG. 11 shows a schematic architecture of a LiFi network with four coordinators and eight devices according to a fifth embodiment.
FIGS. 12A to 12D show respective tables for detection, association, interference and interference handling according to the fifth embodiment.

FIG. 11 shows a schematic architecture of a LiFi network with four coordinators C1 to C4 and eight devices D1 to D8 according to a fifth embodiment. Again, each dashed circle indicates the area that an OWPAN spans. Some devices D1, D2, D3 and D5 are located in an overlapping area, while other devices D4, D6, D7 and D8 are located in non-overlapping areas.

In the following respective tables for detection, association, interference and interference handling according to the fifth embodiment are explained with reference to FIGS. 12A to 12D.

FIG. 12A shows a table that illustrates the detection of coordinators by the devices D1 to D8, wherein a table entry "O" indicates that the device of a column detects the coordinator of the respective row. As an example, device D1 detects the coordinators C3 and C4.

FIG. 12B shows a table that illustrates the association of devices to coordinators, wherein a table entry "X" indicates that the device of a column is associated to the coordinator of the respective row. As an example, device D1 is associated to the coordinator C3.

FIG. 12C shows a table that illustrates the interference detection of local (associated) devices, wherein a table entry "I" indicates that the device of a column associated to the coordinator of the respective row has detected a high interference (and reported the interference to the coordinators in its reach). As an example, device D2 associated to coordinator C1 has detected coordinator C3.

Figures 12D, 13:
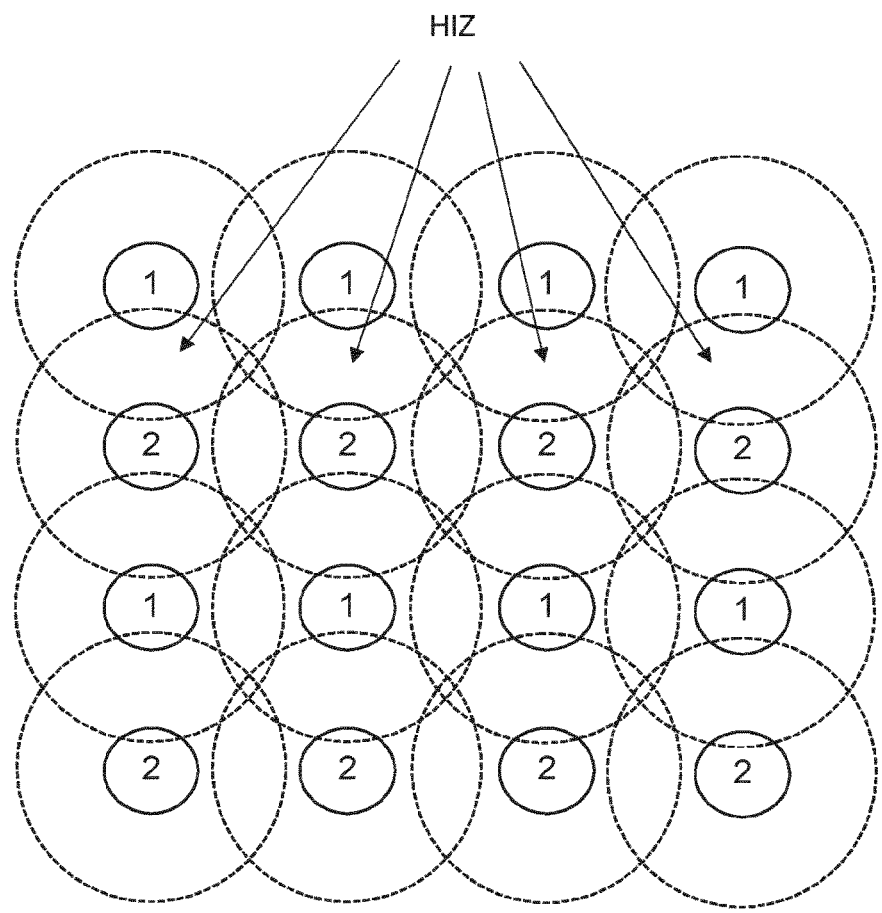
FIG. 13 shows an exemplary floor plan of multiple OWPANs with four coordinators arranged per row.

Finally, FIG. 12D shows a table that illustrates the scheduling that each coordinator applies to handle interference, wherein the columns of the table relate to only two successive time chunks TC 1 and TC 2. Similar to FIG. 8D, the marking "*" indicates a local device for which communication is restricted to the local reserved period, and the marking "**" indicates a neighboring device for which communications is restricted to the neighbor reserved period and communication with local devices is excluded in this reserved period.

Again, as the first rule of interference handling, a coordinator restricts communication with local devices that have detected a neighboring coordinator to the local reserved period. As an example, the coordinator C1 restricts communication with devices D2 and D5 to the reserved period 1 (Res 1) of the first time chunk TC 1, and the coordinator C3 restricts communication with devices D1 and D3 to the reserved period 3 (Res 3) of the second time chunk TC 2.

Again, as the second rule of interference handling, a coordinator restricts the communication with local devices by excluding the reserved period reported by a neighboring device. As an example, the coordinator C2 excludes communication to local devices in reserved period 1 (Res 1) of the first time chunk (TC 1), the coordinator C3 excludes communication to local devices in reserved period 1 (Res 1) of the first time chunk (TC 1), and the coordinator C4 excludes communication to local devices in reserved period 3 (Res 3) of the second time chunk (TC 2).

It is noted that the restriction of device D5 by the C1 is sub-optimal. However, compared to the previous example of FIG. 8D, the coordinator C1 now owns a two-times longer time chunk and therefore can allocate more time to device D5.

FIG. 13 shows an exemplary floor plan of a LiFi network with multiple OWPANs according to a sixth embodiment with four coordinators arranged per row. Each row has one coordinator and four optical transceivers that can be activated by the coordinator in parallel or separately. For this network the global time frame can be divided in two time chunks and each second coordinator can be assigned a different time chunk. The high interference zones (HIZ) can be handled by time-division.

Figures 14, 15A, 15B, 15C:
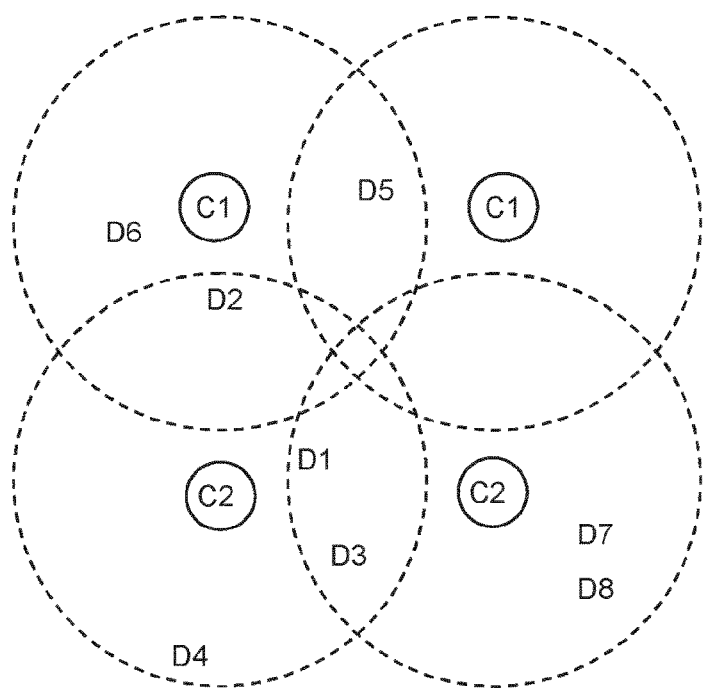
FIG. 14 shows a schematic architecture of a LiFi network with two coordinators and eight devices according to a sixth embodiment.
FIGS. 15A to 15D show respective tables for detection, association, interference and interference handling according to the sixth embodiment.

FIG. 14 shows a schematic architecture of a LiFi network with two coordinators C1 and C2, each controlling a sub-network with two optical transceivers and eight devices D1 to D8 according to the sixth embodiment. Each dashed circle indicates an area that an optical transceiver spans. The device D2 is located in an overlapping area of different sub-networks, the devices D1, D3 and D5 are located in a sub-network, but in overlapping areas of different optical transceivers, and other devices D4, D6, D7 and D8 are located in non-overlapping areas.

It is assumed that the optical transceivers for each sub-network are activated in parallel.

In the following respective tables for detection, association, interference and interference handling according to the sixth embodiment are explained with reference to FIGS. 15A to 15D.

FIG. 15A shows a table that illustrates the detection of coordinators by the devices D1 to D8, wherein a table entry "O" indicates that the device of a column detects the coordinator of the respective row. As an example, device D1 detects the coordinator C2.

FIG. 15B shows a table that illustrates the association of devices to coordinators, wherein a table entry "X" indicates that the device of a column is associated to the coordinator of the respective row. As an example, device D1 is associated to the coordinator C2.

FIG. 15C shows a table that illustrates the interference detection of local (associated) devices, wherein a table entry "I" indicates that the device of a column associated to the coordinator of the respective row has detected an interference (and reported the interference to the coordinators in its reach). As an example, device D2 associated to coordinator C1 has detected coordinator C2.

Figures 15D, 16:
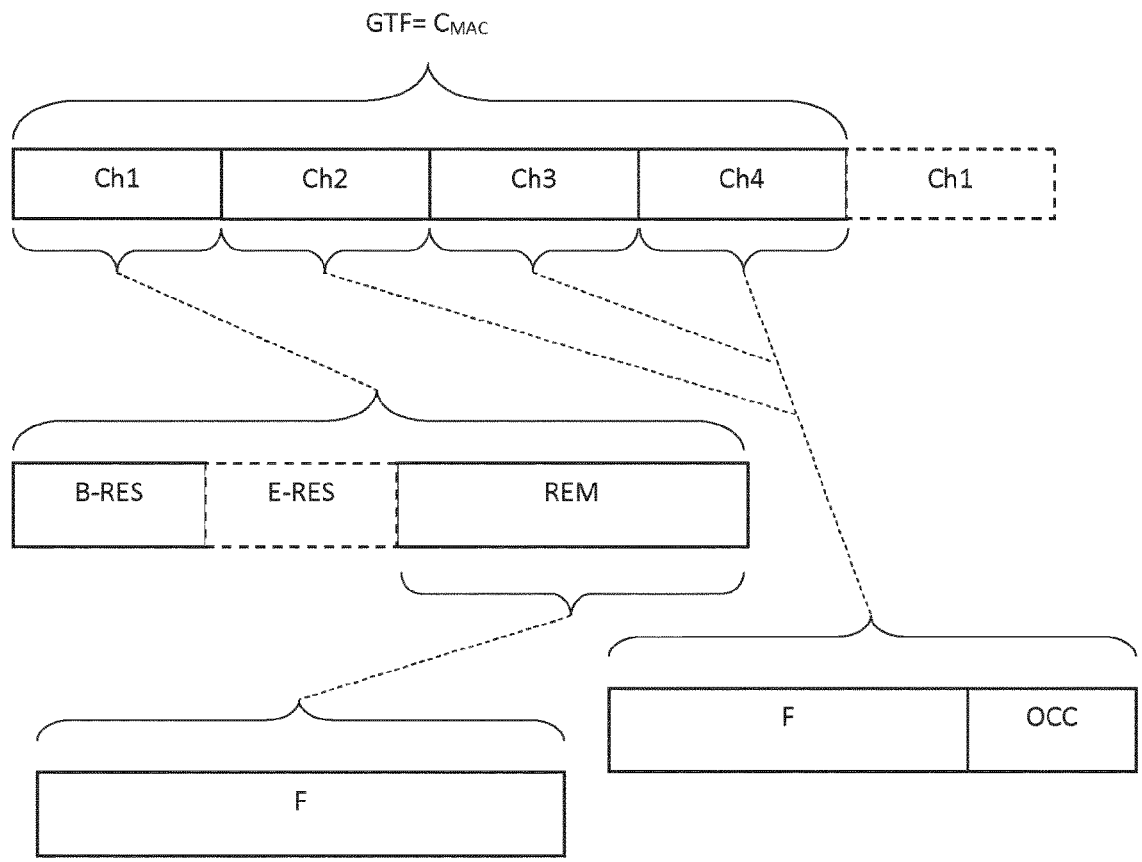
FIG. 16 shows a global time frame structure with free periods and basic and extended reserved periods according a seventh embodiment.

Finally, FIG. 15D shows a table that illustrates the scheduling that each coordinator applies to handle interference, wherein the columns of the table relate to only two successive time chunks TC 1 and TC 2. Similar to FIGS. 8D and 12D, the marking "*" indicates a local device for which communication is restricted to the local reserved period, and the marking "**" indicates a neighboring device for which communications is restricted to the neighbor reserved period and communication with local devices is excluded in this reserved period.

Again, as the first rule of interference handling, a coordinator restricts communication with local devices that have detected a neighboring coordinator to the local reserved period. As an example, the coordinator C1 restricts communication with device D2 to the reserved period 1 (Res 1) of the first time chunk TC 1.

Again, as the second rule of interference handling, a coordinator restricts the communication with local devices by excluding the reserved period reported by a neighboring device. As an example, the coordinator C2 excludes communication to local devices in reserved period 1 (Res 1) of the first time chunk (TC 1).

In the above embodiments, a local coordinator restricts the communication with a local interference device (i.e. interference reporting device) to the local reserved period. However, this can be sub-optimal in case the neighboring coordinator has no or relative low bandwidth requirements for the communication with neighboring devices. E.g., there might be no devices for the neighboring coordinator at all.

In the following seventh embodiment, communication of timing information is separated from the cooperative interference detection. Interference detection is then achieved in that each coordinator advertises its presence in the global time-frame, and each associated device that detects the presence of a neighboring coordinator reports interference by broadcasting the identifier of the detected coordinator to the coordinators in its reach.

As regards the separated timing information, each coordinator reports its reserved period to its detected neighboring coordinators. In more general terms, each coordinator may report scheduling information to its detected neighboring coordinators. The scheduling information may be communicated via an interference device. E.g., a local coordinator communicates its scheduling information to a local interference device which broadcasts the scheduling information to the neighboring coordinators. As another option, the scheduling information may be communicated via a separate network. E.g., a coordinator communicates the scheduling information to its detected neighboring coordinators via a separate network.

Furthermore, in the seventh embodiment, free periods may be communicated in addition to reserved periods. There can be one or multiple free periods. In the global time frame multiple reserved periods owned by multiple neighboring coordinators may be present. To avoid overlap with these reserved periods, a coordinator may determine multiple free periods. Thereby, the above rules for the scheduling can be enhanced for communication with a local interference device if a neighboring coordinator for this device has little or no communication with devices.

Herein, a free period is to be understood as a period that a coordinator excludes for scheduling communication with its local devices. Thus, a coordinator may communicate its free periods to its neighboring coordinators in addition to its reserved period. This allows a local coordinator to schedule communication with a local interference device also in the intersection of free periods of the neighboring coordinators.

Based on the above enhancements of the seventh embodiment, the interference handling rules of the above embodiments can be changed to at least one of the rules that each coordinator restricts communication with a local interference device to its reserved period and to the intersections of free periods of the neighboring coordinators for this device, and that each coordinator restricts communication with local devices by excluding its free periods and the reserved period(s) of neighboring coordinator(s).

FIG. 16 shows a global time frame (which may correspond to a MAC cycle) similar to FIG. 6, in which multiple time-chunks (Ch1 to Ch4) are defined. Each time chunk can be allocated to a coordinator in the LiFi network with multiple coordinators. E.g., a first coordinator may be owner of a first time chunk Ch1 and reserves a period for exclusive use, a second coordinator may be owner of a second time chunk Ch2 and reserves a period for exclusive use, etc.

A time chunk may comprise a basic reserved period (B-RES) and an optional extended period (E-RES). Moreover, in addition to the previous embodiments, a coordinator may determine free periods (F) in any time chunk, in which it excludes communication with its local devices.

More specifically, FIG. 16 indicates a global time frame for a coordinator owning the first time chunk Ch1. In Ch1, the coordinator allocates a reserved period and keeps the remaining free. The coordinator may also provide a free period in the non-owned time chunks Ch2, Ch3, Ch4. The coordinator does not schedule time slots for its local devices in these free periods. The coordinator may allocate time slots for non-interference devices in occupied time periods (OCC) and/or to all its associated devices in the extended reserved period. An occupied period is aligned to the end of a time chunk. This has the advantage that if a local device moves from a non-interference zone to an interference zone, then the schedule for this device does not interfere with the neighboring coordinator if this occupied period falls within the free period of the time chunk owned by the neighboring coordinator.

This leads to the following enhanced rules for the seventh embodiment:

A coordinator is free to reserve a period for communication with its local devices in its own (pre-configured) time chunks. Initially, a coordinator only schedules slots in its reserved period. Moreover, the coordinator may extend its scheduling to time slots in other periods according to at least one of the following restrictions:

The coordinator should not schedule any time slots in a basic reserved period (B-RES) of any non-owned time chunk to ensure that the interference detection process runs without interference. Furthermore, if the coordinator detects interference with a neighboring network (e.g. OWPAN), then for each local interference device, the coordinator restricts communication with this device to its reserved period and for each non-owned time chunk to the intersection of free periods of the neighboring coordinators for this device, and for each neighboring interference device, the coordinator restricts communication with its local devices by excluding its free periods and the reserved period of the associated neighboring coordinator for this device.

Figures 17, 18A:
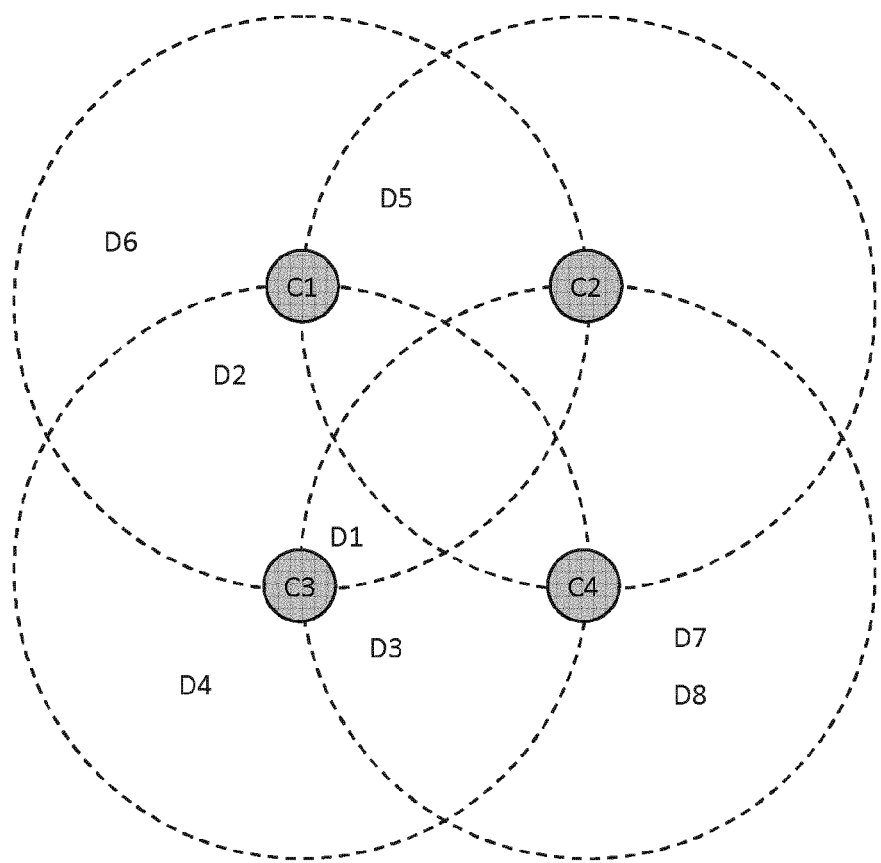

FIG. 17 shows a schematic architecture of an exemplary LiFi network with four coordinators C1 to C4 and eight devices D1 to D8. Each dashed circle indicates the area that an OWPAN spans. Some devices D1, D2, D3 and D5 are located in an overlapping area while other devices D4, D6, D7 and D8 are located in non-overlapping areas.

FIG. 18A shows a table that illustrates the detection of coordinators by the devices D1 to D8, wherein a table entry "O" indicates that the device of a column detects the coordinator of the respective row. As an example, device D6 detects the coordinator C1.

FIG. 18B shows a table that illustrates the association of devices to coordinators, wherein a table entry "X" indicates that the device of a column is associated to the coordinator of the respective row. As an example, device D2 is associated to the coordinator C1.

FIG. 18C shows a table that illustrates the interference detection of local (associated) devices, wherein a table entry "I" indicates that the device of a column has detected an interference (and reported the interference to the coordinators in its reach).

If all coordinators would not provide any free period, the new rules would have no effect on the scheduling compared to the previous embodiments. However, the new rules provide advantages if not all coordinators have to deal with high traffic demand. If a coordinator has low traffic demand as is the case for coordinator C2, it makes sense to provide free periods for its neighboring coordinators. In the following it is assumed that coordinators C1, C3 and C4 offer no free periods and coordinator C2 offers free periods in all time chunks.

FIG. 18D shows a table that illustrates the scheduling that each coordinator applies to handle interference, wherein the columns of the table relate to four successive time chunks Ch1 to Ch4. Here, marking "*" indicates a local interference device, marking "**" indicates a neighboring interference device, and "(Di*)" indicates an additional scheduling of a local interference device Di at an intersection of free periods. The columns "Reserved by" indicate the extended reserved period (E-RES). The basic reserved period (B-RES) is already covered by the rule that the coordinator should not schedule any time slots in the basic reserved period of any non-owned time chunk to ensure that the interference detection process runs without interference and is not shown in this figure.

For each local interference device, the coordinator restricts communication with this device to its reserved period and for each non-owned time chunk to the intersection of the free periods of the neighboring coordinators for this device. Thus, for device D2, coordinator C1 restricts communication to the reserved period of the first time chunk Ch1 (no free period by C3). For device D5, coordinator C1 restricts communication to the reserved period of the first time chunk Ch1 and free periods by C2 in Ch2, Ch3 and Ch4. For device D1, coordinator C3 restricts communication to the reserved period of the third time chunk Ch3 (no free period by C1). For device D3, coordinator C3 restricts communication to the reserved period of the third time chunk Ch3 (no free period by C4). Thus, according to this part of the rules (for each local interference device), Ch3 is still allowed.

Furthermore, for each neighboring interference device, the coordinator restricts communication with its local devices by excluding its free periods and the reserved period of the associated neighboring coordinator for this device. Thus, for device D1, coordinator C1 restricts communication with its local devices by excluding the reserved period of the third time chunk Ch3 (no free period by C1). Since coordinator C3 reserves the whole time chunk of Ch3 for its own use, coordinator C1 should not communicate with device D5 in time chunk Ch3 to avoid interference with device D1. Thus, the free period of coordinator C2 in Ch3 cannot be used by coordinator C1 for D5. For device D5, coordinator C2 restricts communication with its (potential) local devices by excluding the reserved period of the first time chunk Ch1 and free periods by coordinator C2. For device D2, coordinator C3 restricts communication with its local devices by excluding the reserved period of the first time chunk Ch1 (no free period by coordinator C3). For device D1, coordinator C4 restricts communication with its local devices by excluding the reserved period of the third time chunk Ch3 (no free period by C4). For device D3, coordinator C4 restricts communication with its local devices by excluding the reserved period of the third time chunk Ch3 (no free period by C4).

It is noted that the restriction of e.g. device D5 by coordinator C1 has been relaxed compared to the previous embodiments, since the allowed communication time of coordinator C1 with device D5 has been improved.

In the following it is assumed that coordinator C4 offers partially free periods in the first to third time chunks Ch1 to Ch3 and coordinator C2 offers maximum free periods in all time chunks Ch1 to Ch4.

Finally, FIG. 18E shows a table that illustrates the scheduling that each coordinator applies to handle interference according to the new rules with the above additional assumption. Again, the columns "Reserved by" indicate the extended reserved period.

For each local interference device, the coordinator restricts communication with this device to its reserved period and for each non-owned time-chunk to the intersection of the free periods of the neighboring coordinators for this device. Thus, for device D1, coordinator C1 restricts communication to the reserved period of the first time chunk Ch1 (no free period by C3). For device D5, coordinator C1 restricts communication to the reserved period of the first time chunk Ch1 and free periods by C2 in time chunks Ch2 to Ch4. For device D1, coordinator C3 restricts communication to the reserved period of the third time chunk Ch3 (no free period by C1). For device D3, coordinator C3 restricts communication to the reserved period of the third time chunk Ch3 and free periods by C4.

Furthermore, for each neighboring interference device, the coordinator restricts communication with its local devices by excluding its free periods and the reserved period of the associated neighboring coordinator for this device. Thus, for device D1, coordinator C1 restricts communication with its local devices by excluding the reserved period of the third time chunk Ch3 (no free period by C1). For device D5, coordinator C2 restricts communication with its (potential) local devices by excluding the reserved period of the first time chunk Ch1 and free periods by C2. For device D2, coordinator C3 restricts communication with its local devices by excluding the reserved period of the first time chunk Ch1 (no free period by C3). For device D1, coordinator C4 restricts communication with its local devices by excluding the reserved period of the third time chunk Ch3 and free periods by coordinator C4. For device D3, coordinator C4 restricts communication with its local devices by excluding the reserved period of the third time chunk Ch3 and free periods by coordinator C4.

Here, restrictions of device D5 by coordinator C1 and device D3 by coordinator C3 have been relaxed compared to the previous embodiments. According to a modification of at least some of the above embodiments, a coordinator may determine presence of a neighboring coordinator based on an interference report from a reporting device and to determine the reserved period of the neighboring coordinator based on a report or advertisement of the neighboring coordinator via a backbone network. Here, after the report of presence of a neighboring coordinator by the reporting device, coordinators are provided with enough information to further exchange timing information (reserved period, free period, etc.) via the backbone network.

If a coordinator can receive an advertisement of another coordinator, e.g. via a backbone network, it needs to know that this other coordinator is a neighbour coordinator, which means that a reporting device is also in the reach of the other coordinator. This can be achieved by a report of a device that also detected the neighboring coordinator.

As regards reporting of interference in the at least some of the above embodiments, it is desirable that two cooperating coordinators are both provided with information on an interference device. From that perspective, it makes sense that the reporting device reports to the local coordinator and to the neighboring coordinator.

However, as an alternative, coordinators may communicate via a second network (e.g. via a backbone network), so that a device needs to be reported to one coordinator only. As an example, it is assumed that two coordinators C1 and C2 and three devices D1, D2 and D3 are provided in a LiFi network. Devices D1 and D2 are associated to coordinator C1 and device D3 is associated to coordinator C2, while device D2 is located in an overlapping zone. Now, if device D2 would only report to coordinator C1, coordinator C1 would restrict communication with device D2 to the reserved period, while coordinator C2 would not be aware of device D2 and would schedule communication with device D3 including the reserved period for device D2. The sub-networks would therefore interfere.

This problem can be solved by providing the second network that connects coordinators C1 and C2. After receiving the report from device D2, coordinator C1 could inform coordinator C2 on the detection of device D2 and its reserved period via the second network.

To summarize, a LiFi network with multiple coordinators has been described, where interference in the overlapping areas between the local parts of the network can occur if each coordinator determines its own local time schedule for communicating with devices. To solve this problem, a cooperation between the coordinators is proposed to determine non-interfering local time schedules whereby the coordinators rely on interference reports from the devices in the overlapping areas and apply a small number of simple rules. The proposed method is simple, scalable and independent from a central unit.

While the invention has been illustrated and described in detail in the drawings and foregoing description, such illustration and description are to be considered illustrative or exemplary and not restrictive. The invention is not limited to the disclosed embodiments. The proposed interference detection and handling procedures can be applied to and possibly standardized in other types of wireless networks and with other types of time frames and control fields. Moreover, the invention can be applied in any type of network devices that implement the role of a coordinator or the role of an associated device, respectively.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 3 and 4 can be implemented as program code means of a computer program and/or as dedicated hardware of the commissioning device or luminaire device, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A system for handling interference in a wireless network comprising at least two coordinators and a plurality of devices selectively associated to a respective one of the coordinators,
wherein at least one of the coordinators is adapted to determine an own reserved period of a global time frame used for the transmissions and is further adapted to advertise its identifier and its determined own reserved period
wherein at least one of the devices is adapted to check whether an advertisement with an identifier has been received from a neighboring coordinator, to generate an interference report which comprises at least one of an identifier of an associated local coordinator and the identifier of the neighboring coordinator, and to report the interference report to the associated local coordinator or to the neighboring coordinator or to broadcast the interference report to all coordinators in its reach; and
wherein the at least one coordinator is further adapted to determine presence of a neighboring coordinator and its reserved period based on at least one of an interference report received from a reporting device of the devices and a report of the neighboring coordinator, and to control transmissions by at least one of limiting communication with the reporting device to its own reserved period in the global time-frame and limiting communication with other ones of the devices by excluding from the global time frame the reserved period of the neighboring coordinator reported by the reporting device or by the neighboring coordinator; and
wherein the wireless network is based on optical communication with line-of-sight character.

2. An apparatus for handling interference in a wireless network comprising at least two coordinators and a plurality of devices selectively associated to a respective one of the coordinators, wherein the apparatus is adapted to determine an own reserved period of a global time frame used for the transmissions and to advertise its identifier and its determined own reserved period, wherein the apparatus is further adapted to determine presence of a neighboring coordinator and its reserved period based on at least one of an interference report received from a reporting device of the devices and a report of the neighboring coordinator, and to control transmissions by at least one of limiting communication with the reporting device to its own reserved period in the global time-frame and limiting communication with other ones of the devices by excluding from the global time frame the reserved period of the neighboring coordinator reported by the reporting device or by the neighboring coordinator; and wherein the wireless network is based on optical communication with line-of-sight character.

3. The apparatus of claim 2, wherein the at least two coordinators are synchronized so that start time and repetition time of the global time frame is equal for the at least two coordinators.

4. The apparatus of claim 2, wherein the apparatus is preconfigured to own a predetermined time period of the global time frame, and wherein the own reserved period is provided within the predetermined time period.

5. The apparatus of claim 4, wherein the apparatus is adapted to extend the own reserved period up to the end of the predetermined time period.

6. The apparatus of claim 2, wherein the apparatus is adapted to apply within the own reserved period at least one of an advertisement period for broadcasting
its identifier,
a report period in which an associated device reports interference,
a schedule period for providing a schedule of slots for communication with its associated devices, and
an association period as an opportunity for devices to get associated.

7. The apparatus of claim 2, wherein the apparatus is adapted to allocate less time slots in the own reserved period for non-interfering devices and to compensate that by allocating more time slots in other time periods of the global time frame for the non-interfering devices to free up time slots in the own reserved period for allocation to interfering devices.

8. The apparatus of claim 2, wherein the apparatus is adapted to additionally determine at least one own free period of the global time frame and to advertise the determined at least one own free period by communicating via a device that has detected a neighboring coordinator or via a separate network, and wherein the apparatus is further adapted to control transmissions by at least one of limiting communication with the reporting device to its own reserved period and to intersections of free periods of neighboring coordinators and limiting communication with other ones of the devices by excluding its own free period and the reserved period of the neighboring coordinator reported by the reporting device or by the neighboring coordinator.

9. The apparatus of claim 2, wherein the apparatus is adapted to report the own reserved period by at least one of communicating via a device that has detected another coordinator or via a separate network.

10. An apparatus for handling interference in a wireless network comprising at least two coordinators and a plurality of devices selectively associated to a respective one of the coordinators, wherein the apparatus is adapted to check whether an advertisement with an identifier has been received from a neighboring coordinator, to generate an interference report which comprises at least one of an identifier of an associated local coordinator and the identifier of the neighboring coordinator, and to report the interference report to the associated local coordinator or to the neighboring coordinator or to broadcast the interference report to all coordinators in its reach; and wherein the wireless network is based on optical communication with line-of-sight character; and
wherein the apparatus is adapted to detect one of the at least two coordinators based on its advertisement, to align to a global time frame provided by the detected coordinator, and to get associated with the detected coordinator by using an existing protocol.

11. The apparatus of claim 10, wherein the apparatus is adapted to generate an interference report which comprises the identifier and a reserved period of a global time frame of an associated local coordinator and the neighboring coordinator, and to report the interference report to the associated local coordinator or to the neighboring coordinator, or to broadcast the interference report to all coordinators in its reach.

12. The apparatus of claim 10, wherein the apparatus is adapted to generate an interference report which comprises the identifier, the reserved period and at least one free period of a global time frame of an associated local coordinator and the neighboring coordinator, and to report the interference report to the associated local coordinator or to broadcast the interference report to all coordinators in its reach.

13. The apparatus of claim 2, wherein the wireless network comprises at least two overlapping optical wireless personal area networks, OWPANs, each controlled by one of the at least two coordinators, and wherein each OWPAN provides connections for the plurality of devices.

14. The apparatus of claim 2, wherein the at least two coordinators share a medium for downlink communication in the wireless network and the plurality of devices share a medium for uplink communication in the wireless network.

15. The apparatus of claim 14, wherein at least one of a free-medium indication and a busy-medium indication is used to control an access to an uplink medium.

16. A method of handling interference in a wireless network comprising at least two coordinators and a plurality of devices selectively associated to a respective one of the coordinators, wherein the method comprises:
determining at one of the at least two coordinators an own reserved period of a global time frame used for transmissions;
advertising by the coordinator its identifier and its determined own reserved period;
determining presence of a neighboring coordinator and its reserved period based on at least one of an interference report received from a reporting device of the devices and a report of the neighboring coordinator; and
controlling transmissions by at least one of limiting communication with the reporting device to its own reserved period in the global time-frame and limiting communication with other ones of the devices by excluding from the global time frame the reserved period of the neighboring coordinator reported by the reporting device or by the neighboring coordinator;
and wherein the wireless network is based on optical communication with line-of-sight character.

17. The method of claim 16, further comprising determining at the one of the at least two coordinators at least one own free period of the global time frame, advertising the at least one own free period, and controlling transmissions by at least one of limiting communication with the reporting device to its own reserved period and to intersections of free periods of neighboring coordinators and limiting communication with other ones of the devices by excluding the at least one own free period and the reserved period of the neighboring coordinator reported by the reporting device or by the neighboring coordinator.

18. The method of claim 16, wherein the reporting comprises communicating via a device that has detected the neighboring coordinator or via a separate network.

19. A method of handling interference in a wireless network comprising at least two coordinators and a plurality of devices selectively associated to a respective one of the coordinators, wherein the method comprises:
checking whether an advertisement with an identifier has been received from a neighboring coordinator;
generating an interference report which comprises at least one of an identifier of an associated local coordinator and the identifier of the neighboring coordinator, reporting the interference report to the associated local coordinator or to the neighboring coordinator or broadcasting the interference report to all coordinators in its reach;
and wherein the wireless network is based on optical communication with line-of-sight character; and
detecting one of the at least two coordinators based on its advertisement, to align to a global time frame provided by the detected coordinator, and to get associated with the detected coordinator by using an existing protocol.

20. The method of claim 19, wherein the interference report comprises the identifier and the reserved period of a global time frame of an associated local coordinator and the neighboring coordinator.

21. The method of claim 19, wherein the interference report comprises the identifier, the reserved period and at least one free period of the global time frame of an associated local coordinator and the neighboring coordinator.

22. A non-transitory computer readable medium comprising instructions, which when executed by a processor of computer device cause the processor to perform the method of claim 16.

* * * * *